United States Patent
Propst et al.

(10) Patent No.: US 10,350,529 B2
(45) Date of Patent: Jul. 16, 2019

(54) FILTRATION ARTICLE WITH FLUOROPOLYMER KNIT

(71) Applicant: Entegris, Inc., Billerica, MA (US)

(72) Inventors: Eric Keith Propst, Avondale, PA (US); Steven H. Speck, Elkton, MD (US)

(73) Assignee: Entegris, Inc., Billerica, MA (US)

(*) Notice: Subject to any disclaimer, the term of this patent is extended or adjusted under 35 U.S.C. 154(b) by 1012 days.

(21) Appl. No.: 13/947,733

(22) Filed: Jul. 22, 2013

(65) Prior Publication Data

US 2014/0021145 A1    Jan. 23, 2014

Related U.S. Application Data

(63) Continuation-in-part of application No. 13/923,810, filed on Jun. 21, 2013, now abandoned.

(60) Provisional application No. 61/674,677, filed on Jul. 23, 2012, provisional application No. 61/662,775, filed on Jun. 21, 2012.

(51) Int. Cl.
*B01D 39/16* (2006.01)
*B01D 39/08* (2006.01)

(52) U.S. Cl.
CPC .......... *B01D 39/16* (2013.01); *B01D 39/083* (2013.01); *B01D 39/1692* (2013.01); *B01D 2239/065* (2013.01)

(58) Field of Classification Search
CPC combination set(s) only.
See application file for complete search history.

(56) References Cited

U.S. PATENT DOCUMENTS

| | | | |
|---|---|---|---|
| 3,953,566 A | 4/1976 | Gore | |
| 4,609,465 A * | 9/1986 | Miller | B01D 29/111 210/323.2 |
| 4,663,041 A | 5/1987 | Miyagi et al. | |
| 5,096,473 A | 3/1992 | Sassa et al. | |
| 5,180,409 A * | 1/1993 | Fischer | B01D 39/086 139/408 |
| 5,183,545 A | 2/1993 | Branca et al. | |
| 5,476,589 A | 12/1995 | Bacino | |

(Continued)

FOREIGN PATENT DOCUMENTS

| | | |
|---|---|---|
| CN | 1308559 A | 8/2001 |
| CN | 101934173 A | 1/2011 |

(Continued)

OTHER PUBLICATIONS

International Search Report for PCT/US2013/051553 dated Nov. 18, 2013.

*Primary Examiner* — Bobby Ramdhanie
*Assistant Examiner* — Michael J An
(74) *Attorney, Agent, or Firm* — Entegris, Inc.

(57) ABSTRACT

Disclosed is a filtration article comprising a first layer comprising porous PTFE for fluid filtration (e.g., a PTFE membrane), and a second layer comprising strands of fluoropolymer fibers arranged to form a stable knit. The knit layer comprises interlocking regions that are each defined by corresponding sets of at least two interlocking loop portions of the fluoropolymer fiber strands. In filtration article embodiments, the fluoropolymer fiber strands may be twisted and/or have a rounded outer configuration. The knit layer provides improved dimensional stability as a support layer for the filtration layer and/or as a drainage layer.

38 Claims, 6 Drawing Sheets

(56) References Cited

U.S. PATENT DOCUMENTS

| | | | |
|---|---|---|---|
| 5,708,044 A | 1/1998 | Branca | |
| 6,334,881 B1 | 1/2002 | Giannetta et al. | |
| 6,454,942 B1* | 9/2002 | Shintani | B01D 63/10 |
| | | | 210/321.72 |
| 6,517,919 B1* | 2/2003 | Griffin | B01D 39/1692 |
| | | | 210/448 |
| 6,540,773 B2* | 4/2003 | Dong | A61F 2/07 |
| | | | 623/1.13 |
| 6,541,589 B1 | 4/2003 | Baillie | |
| 7,083,564 B2* | 8/2006 | Stoyell | B01D 29/111 |
| | | | 493/407 |
| 7,306,729 B2 | 12/2007 | Bacino et al. | |
| 7,378,020 B2 | 5/2008 | Ieraci et al. | |
| 7,531,611 B2 | 5/2009 | Sabol et al. | |
| 8,529,814 B2* | 9/2013 | Palinkas | B01D 69/08 |
| | | | 210/490 |
| 2004/0060858 A1* | 4/2004 | Lucas | B01D 29/21 |
| | | | 210/338 |
| 2005/0288775 A1* | 12/2005 | Dong | A61F 2/07 |
| | | | 623/1.54 |
| 2006/0204654 A1* | 9/2006 | Klare | B01D 67/0088 |
| | | | 427/115 |
| 2007/0075014 A1 | 4/2007 | Olson et al. | |
| 2008/0237116 A1* | 10/2008 | Bacino | B01D 39/1692 |
| | | | 210/483 |
| 2009/0093602 A1 | 4/2009 | Ford | |
| 2009/0187197 A1 | 7/2009 | Roeber et al. | |
| 2010/0248324 A1 | 9/2010 | Xu et al. | |
| 2011/0039960 A1 | 2/2011 | Xu et al. | |
| 2012/0061314 A1 | 3/2012 | Choi et al. | |
| 2012/0064273 A1 | 3/2012 | Bacino | |
| 2013/0075325 A1 | 3/2013 | McClary et al. | |
| 2013/0263738 A1* | 10/2013 | Wang | B01D 46/521 |
| | | | 95/285 |
| 2016/0096127 A1* | 4/2016 | McClary | B01D 39/083 |
| | | | 210/767 |

FOREIGN PATENT DOCUMENTS

| | | | |
|---|---|---|---|
| CN | 102317519 A | | 1/2012 |
| EP | 0139822 | * | 5/1985 |
| EP | 0217482 | | 4/1987 |
| JP | 09-38472 A | | 2/1997 |
| JP | 1999-347378 A | | 12/1999 |
| JP | 2000-334272 A | | 12/2000 |
| JP | 2000-354743 A | | 12/2000 |
| JP | 2001-353424 A | | 12/2001 |
| JP | 2005-278589 A | | 10/2005 |
| JP | 3120829 U | | 3/2006 |
| JP | 2007-167783 A | | 7/2007 |
| JP | 2011-245454 A | | 12/2011 |
| WO | WO-2007/114069 A1 | | 10/2007 |
| WO | 2014/018470 A2 | | 1/2014 |

* cited by examiner

FILTRATION ARTICLE WITH FLUOROPOLYMER KNIT

RELATED APPLICATION

The present application claims priority to U.S. Provisional Patent Application No. 61/674,677 filed Jul. 23, 2012; and claims priority to U.S. Utility application Ser. No. 13/923,810, filed Jun. 21, 2013; which in turn claims priority to U.S. Provisional Patent Application No. 61/662,775 filed Jun. 21, 2012.

BACKGROUND OF THE INVENTION

Porous membranes are widely used in the filtration of particulate, ionic, microbial and other contaminants from fluids in pharmaceutical, microelectronics, chemical and food industries. In use, the membranes are formed into a device (e.g., pleated cartridges which may be housed within a capsule, hollow tubes, stack of flat disks, etc.) which is placed in the fluid stream to be filtered.

To meet chemical and temperature resistance requirements, most filtration devices used in semiconductor fabrication are constructed entirely of fluoropolymer materials. The trend towards narrower line widths in semiconductor manufacturing has placed an ever increasing burden on particulate contamination control in semiconductor fabrication. Such a trend has led to the introduction of fluoropolymer filtration membranes having rated pore sizes as low as 10 nm.

While such membranes provide superior particle filtration, there is a desire to extend the life cycle, or time-in-use, of the membranes, while maintaining the filtration efficiency thereof. In this regard, in typical filtration implementations, a support layer may be positioned downstream of a fluoropolymer filtration membrane to support the membrane against the pressure of fluid flow. In addition, the support layer or another downstream layer may provide drainage functionality (e.g., by acting as a spacing layer with downstream passageways therethrough to thereby facilitate fluid flow through the membrane). In that regard, an upstream drainage layer may also be utilized.

In such arrangements, known upstream and downstream layers are constructed of fluoropolymeric fiber materials (e.g., PTFE, PFA or PVDF) in the form of wovens, non-wovens or nets. Over extended periods, such woven, non-woven or net layers may exhibit movement of fibers in the layer structure to a degree that renders such layers unable to provide the desired support to the filtration membrane against applied fluid pressure. This may result in damage to the membrane microstructure, and degradation of filtration efficiency and drainage functionality, to the point that filter replacement is required. As may be appreciated, filter replacement entails not only system downtime, but also results in added filter costs and utilization of maintenance personnel resources.

Therefore, a need exists for a fluid filtration article having extended time-in-use advantages, while providing satisfactory filtration efficiency over the extended life of the device. Fluid filtration articles constructed with the knit materials of the present invention fulfill such a need.

SUMMARY OF THE INVENTION

In one aspect, an improved filtration article is provided for filtering particles from a fluid stream that includes first and second layers positionable across a fluid stream, wherein the first layer comprises a porous PTFE for filtering particles from the fluid stream and the second layer comprises strands of fluoropolymer fibers arranged to form a stable knit. The second layer may provide for at least one of support and drainage of the first layer.

More particularly, the knit fluoropolymer fiber layer may include a plurality of interlocking regions that are each defined by corresponding different sets of at least two interlocking loop portions of the plurality of strands of fluoropolymer fibers. The interlocking regions of the knit may define a plurality of wales and a plurality of courses, wherein for at least a first portion of the strands each strand comprises different loop portions that partially define different, alternating ones of the interlocking regions located along at least two different wales.

In relation to such aspect, the present inventors have recognized that the combinative use of a porous PTFE filtration layer and a knit fluoropolymer fiber layer yields a filtration article having an improved life cycle, while providing efficient particle filtration. More particularly, the inventors have recognized that the utilization of a knit fluoropolymer fiber layer having fiber strands with interlocking loop portions provides enhanced dimensional stability over extended time periods, thereby facilitating realization of the noted advantages.

In contemplated implementations, the porous PTFE filtration has a bubble point, measured as described hereinbelow, greater than about 30 psi. For example, in fine particulate filtration applications, the porous PTFE filtration layer may have a bubble point greater than about 50 psi, and preferably greater than about 80 psi (e.g., for use in semiconductor fabrication applications).

In certain implementations, the improved filtration article may be provided so that, within a cross section of each of the plurality of interlocking regions, different lengths of the corresponding interlocking loop portions are located within at least three different stratums. As may be appreciated, such an arrangement enhances stability across the knit while accommodating tortuous fluid flow about the fiber strands in the interlocking regions.

For each of the interlocking regions the fiber strands of the knit layer may be provided so that the corresponding interlocking loop portions extend about an arc of at least 90° along different corresponding arcuate paths. In some implementations, at least a portion of the interlocking loop portions corresponding with each of interlocking regions may be provided to extend about an arc of at least 180° along different corresponding arcuate paths. In certain embodiments, at least a portion of the interlocking loop portions corresponding with at least a portion of the interlocking regions may be provided as closed loops.

In a further aspect, the improved filtration article may be provided so that each of the plurality of interlocking regions is defined by corresponding different sets of at least three interlocking loop portions of the strands of fluoropolymer fibers. Such approach may be utilized to yield further enhanced dimensional stability.

In various embodiments, the strands of fluoropolymer fibers utilized in the knit layer may be provided to have various features. For example, all or at least a portion of the fluoropolymer fibers may be of a rounded outer configuration and/or may be twisted. In some implementations, the strands of fluoropolymer fibers may comprise monofilaments or multifilaments. Further, in some applications, the strands of fluoropolymer fibers may comprise hollow filaments.

As may be appreciated, the knit layer of the improved filtration article may be of a warp knit type. By way of primary example, a Raschel knit, a Tricot knit, or other similar knit may be employed.

In this regard, and as noted above, for at least a first portion of the plurality of strands utilized in the knit layer each strand may include different loop portions that partially define different, alternating ones of the interlocking regions located along at least two different ones of the plurality of wales. Stated differently, for at least a first portion of the strands, each strand may zig-zag between and form loop portions at different, alternating ones of the interlocking regions located along at least two different wales of the knit layer. Such an arrangement advantageously distributes a fluid pressure load applied to the knit layer by distributing the load at and across interlocking regions located in different wales and courses. Further, in some embodiments, the knit layer may be provided so that, for at least a second portion of the plurality of strands of the knit layer, each strand comprises different loop portions that partially define different ones of all or substantially all of the interlocking regions located along a corresponding one of the plurality of wales, thereby yielding further load distribution.

In an additional aspect, the knit layer of the improved filtration article may be provided with voids, or open spaces, which extend between the fiber strands and plurality of interlocking regions through the knit layer. In this regard, the knit layer may be provided so that, on each of the opposing sides of the knit layer, the voids define at least about 10% of the corresponding areas, thereby facilitating fluid flow therethrough. Further, the knit layer may be provided so that the strands of fluoropolymer fibers, including the interlocking regions defined thereby, define at least about 20% of the areas of the opposing sides of the knit layer, thereby facilitating effective use of the knit layer as a drainage layer in the filtration article. In some arrangements the interlocking regions may define at least about 40% of the areas.

In contemplated embodiments of an improved filtration article, a knit fluoropolymer fiber layer may be positioned downstream of a porous PTFE layer (e.g., a PTFE membrane) to provide for at least support of the PTFE layer. More particularly, the knit layer may be provided to support the porous PTFE layer against the pressure of a fluid stream passing therethrough. Further, the knit layer may function as a drainage, or spacing, layer. In various arrangements a downstream knit layer may be disposed directly adjacent the PTFE layer or with one or more intermediate layers therebetween. The downstream knit layer may be interconnected to the PTFE layer.

An additional knit fluoropolymer fiber layer may be disposed upstream of the porous PTFE layer to provide drainage functionality. The upstream knit layer may be disposed directly adjacent to the PTFE layer or with one or more intermediate layers therebetween. The upstream knit layer may be interconnected to the PTFE layer.

In some implementations, a knit fluoropolymer fiber layer and a porous PTFE layer may each be of a pleated configuration. More particularly, such pleated layers may be disposed in at least partially nested co-relation. In one arrangement, the nested, pleated layers may be disposed about and along an axis to define a filtration article having a tubular configuration. In this regard, the pleats of each layer may be provided to extend substantially parallel to the axis. The filtration article may be disposed so that a fluid stream flows through the filtration article from the outside of the tubular configuration thereof to an internal space within the tubular configuration. Alternatively, an opposite fluid flow direction through the tubular configuration may be employed.

In another characterization, a filtration article may be provided for positioning in a fluid stream applying a fluid pressure load upon such filtration article of between about 1 psid and 10 psid, wherein the plurality of interlocking regions of the knit layer define a plurality of voids therebetween across the knit layer. In this regard, each of the voids may have a first area prior to being positioned in the fluid stream and a corresponding second area while positioned in the fluid stream. The knit layer may be provided so that for each of the plurality of voids the corresponding second area is less than about two times the corresponding first area thereof.

In a further aspect, a filtration article may be provided for positioning in a fluid stream applying a fluid pressure load upon the filtration article of between about 1 psid and 10 psid, wherein the knit layer is provided so that each of the interlocking regions thereof is located at corresponding distances from adjacent ones of the plurality of interlocking regions along the wales and courses thereof. In turn, for each of the plurality of interlocking regions the corresponding distances, while the knit layer is positioned in the fluid stream, may be within 200% of initial values thereof prior to being positioned in the fluid stream.

In another aspect, a method for filtering particles from fluid in a fluid stream is provided. The method may include the step of filtering particles from a fluid stream utilizing a porous PTFE membrane positioned across the fluid stream. The method may further include supporting the porous PTFE membrane against the fluid pressure load applied by the fluid stream utilizing a stable knit layer positioned adjacent to and downstream of the porous PTFE membrane.

The stable knit layer employed in the method may include a plurality of strands of fluoropolymer fibers arranged to form a knit having a plurality of interlocking regions that are each defined by corresponding different sets of at least two interlocking loop portions of the plurality of strands of fluoropolymer fibers. In this regard, the method may include distributing of the fluid pressure load across the knit layer at the interlocking regions.

Numerous additional features and advantages of the present invention will become apparent to those skilled in the art upon consideration of the embodiment descriptions provided hereinbelow.

DETAILED DESCRIPTION OF THE INVENTION

Described herein are embodiments of fluid filtration articles comprising at least one layer of a fluoropolymer knit material. The knit layer may be used as a support and/or drainage layer in a filter cartridge that may be made wholly of fluoropolymer materials. Such knit layer(s) provide for filtration articles having improved time-in-use qualities, with satisfactory particle filtration efficiency.

Figure 1:
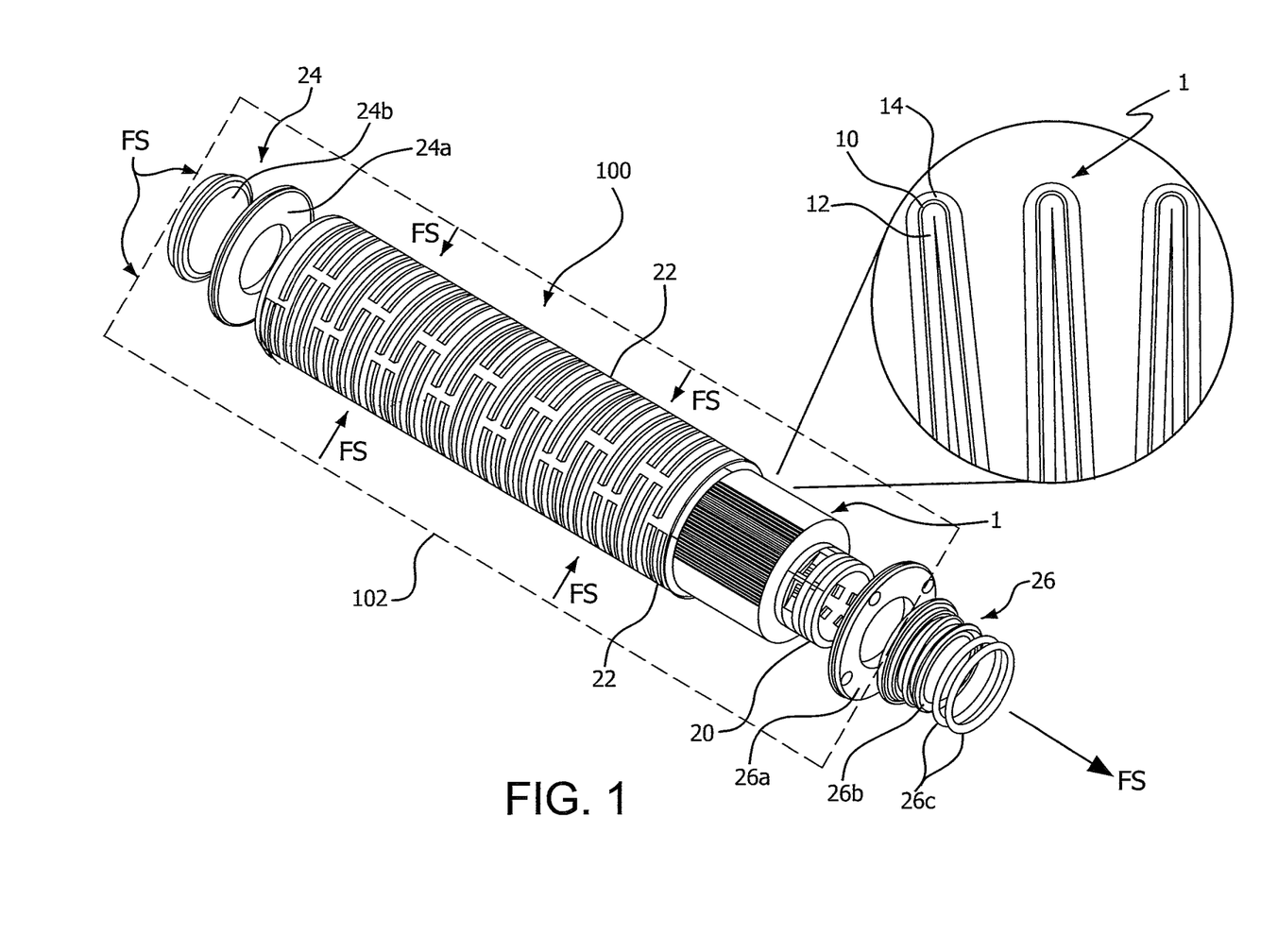
FIG. 1 illustrates an embodiment of a filtration device comprising a filtration article embodiment of the present invention.

FIG. 1 is an illustration of a filter cartridge (100) that may be constructed wholly of fluoropolymer materials and that may be sized for positioning within a filtration capsule (102) (depicted by phantom lines in FIG. 1) through which a fluid stream (FS) passes. The filter cartridge (100) may include a filtration article (1) that comprises a pleated porous fluoropolymer filtration membrane (10), a pleated fluoropolymer knit layer (12) disposed on the downstream side of the filtration membrane (10), and an optional pleated fluoropolymer knit layer (14) disposed on the upstream side of the filtration membrane (10). As shown, the filtration membrane (10), knit layer (12) and knit layer (14) may be at least partially nested. One or both ends of the pleated filtration membrane (10), knit layer (12), and knit layer (14) of filtration article (1) may be potted to sealably interconnect such end(s).

As may be appreciated, the utilization of a pleated configuration in filtration articles provides for increased filtration capacity by increasing the operative size of filtration membrane (10). In the embodiment shown in FIG. 1, the pleated filtration article (1) is of a cylindrical, tubular configuration having outwardly-projecting pleats of an inverted V-shaped configuration that are positioned about and extend along a longitudinal axis from end-to-end of the filtration article (1). In this regard, the peats define V-shaped regions, or valleys, between adjacent ones of the pleats about and along the longitudinal axis of the article.

The filter cartridge (100) may also include an inner core (20), an outer cage (22), and end assemblies (24), (26). The end assembly (24) may include an annular member (24a) having an annular interface interconnected to outer cage (22) (e.g., via a surface-to-surface melt operation), and a closure member (24b) having an annular surface interconnected to annular member (24a) (e.g., via a surface-to-surface melt operation). The end assembly (26) may include an annular member (26a) having an annular surface interconnected to an annular surface of a flanged tubular interface member (26b), and seal members (26c) (e.g., O-Rings) disposed on the tubular interface member (26b), wherein the end assembly (26) may be sealably interconnected to an exit port from filtration capsule (102).

The fluoropolymer membrane (10) may comprise an expanded PTFE membrane which may be prepared according to the methods described in U.S. Pat. No. 7,306,729, U.S. Pat. No. 3,953,566, U.S. Pat. No. 5,476,589 and U.S. Pat. No. 5,183,545, hereby incorporated by reference in their entirety. The fluoropolymer membrane may also comprise an expanded polymeric material comprising a functional TFE copolymer material comprising a microstructure characterized by nodes interconnected by fibrils, wherein the functional TFE copolymer material comprises a functional copolymer of TFE and PSVE. The functional TFE copolymer material may be prepared according to the methods described in U.S. Patent Publication No. 2010/0248324, hereby incorporated by reference in its entirety.

The core (20), cage (22) and end assemblies (24), (26) may be comprised of known thermoplastic fluoropolymers such as PFA, FEP, ETFE, PCTFE, ECTFE, PVDF, etc.

As shown in FIG. 1, the filter cartridge (100) may be disposed so that the fluid stream (FS) flowing into filtration capsule (102) flows through openings in cage (22), through filtration article 1, and through openings of core (20) to a tubular passageway extending through and out of the filter cartridge (100) via end assembly (26). The upstream knit layer (14) acts as a spacer to provide passageways for fluid flow between and through the outwardly-facing surfaces of adjacent ones of the pleats of the filtration membrane (10). The downstream layer (12) acts as a spacer to provide passageways for fluid flow between and through the inwardly-facing surfaces of the filtration membrane (10). The downstream knit layer (12) is further disposed to provide support for the filtration membrane (10) against applied fluid pressure.

In the later regard, in the illustrated arrangement the downstream layer (12) may be disposed directly adjacent to filtration membrane (10) to provide surface-to-surface support of the filtration membrane (10) against the fluid pressure load applied by fluid stream FS. In other arrangements, the downstream layer (12) may provide support to filtration membrane (10) with one or more intermediate layers positioned therebetween.

As noted above and further described below, the downstream layer (14) may be of a knit construction that advantageously distributes the fluid pressure load across the downstream layer (14) via the provision of interlocking regions, thereby yielding enhanced stability and increased time-in-use attributes relative to prior fluid filtration articles. In certain arrangements such as the pleated configuration shown in FIG. 1, a knit construction of downstream layer (14) also defines passageways between and about the interlocking regions to facilitate fluid flow therethrough, i.e., membrane drainage functionality.

In various embodiments, filtration articles (e.g., filter article (1) referenced above) may include a filtration layer (e.g., filtration membrane (10) referenced above) and one or more knit layer(s) (e.g., downstream layer (12) and/or upstream layer (14) referenced above) that comprise strands of fluoropolymer fibers arranged to define a knit with interlocking regions having interlocking loops which reduce material stretch in at least one direction to yield a more dimensionally stable knit. Also, the interlocking loop configuration of the knit construction provides additional space to allow fluid flow patterns in and around interlacing fibers. This is advantageous compared to a woven construction having orthogonal fibers in which flow may be restricted to the woven's mesh openings only.

The fibers of the knit layer(s) may comprise fluoropolymers selected from PTFE, PVDF, FEP or PFA. Preferably, a PTFE fiber may be used to construct the knit layer. A PTFE knit layer is constructed from yarn having at least one PTFE fiber. The term PTFE is meant to also include expanded PTFE, expanded modified PTFE, and expanded copolymers of PTFE, as described in U.S. Pat. Nos. 5,708,044, 6,541,589, and 7,531,611, and U.S. patent application Ser. Nos. 11/906,877 and 12/410,050, all of which are hereby incorporated by reference in their entirety. The PTFE fiber comprises oriented fibrils and may be non-porous or porous. The PTFE fiber may be a monofilament or it may be two different PTFE fibers having differing deniers, density, length or dimensional differences. A multiple strand of yarn having at least one PTFE fiber and at least one other type of fluoropolymer fiber that is not PTFE may also be employable in filtration article embodiments.

Figure 2A:
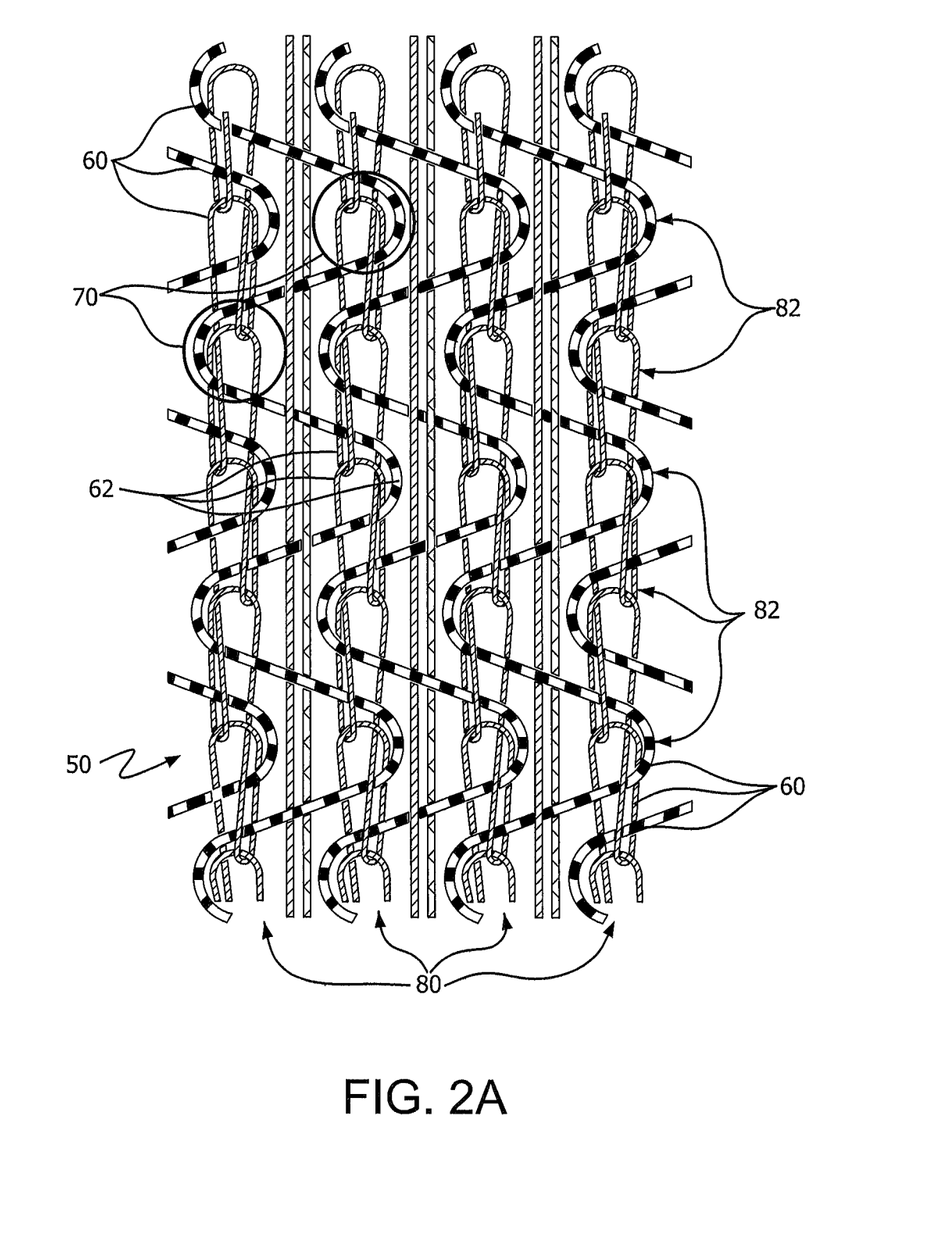
FIGS. 2A and 2B illustrate embodiments of a knit layer of a filtration article embodiment of the present invention.
Figure 2B:
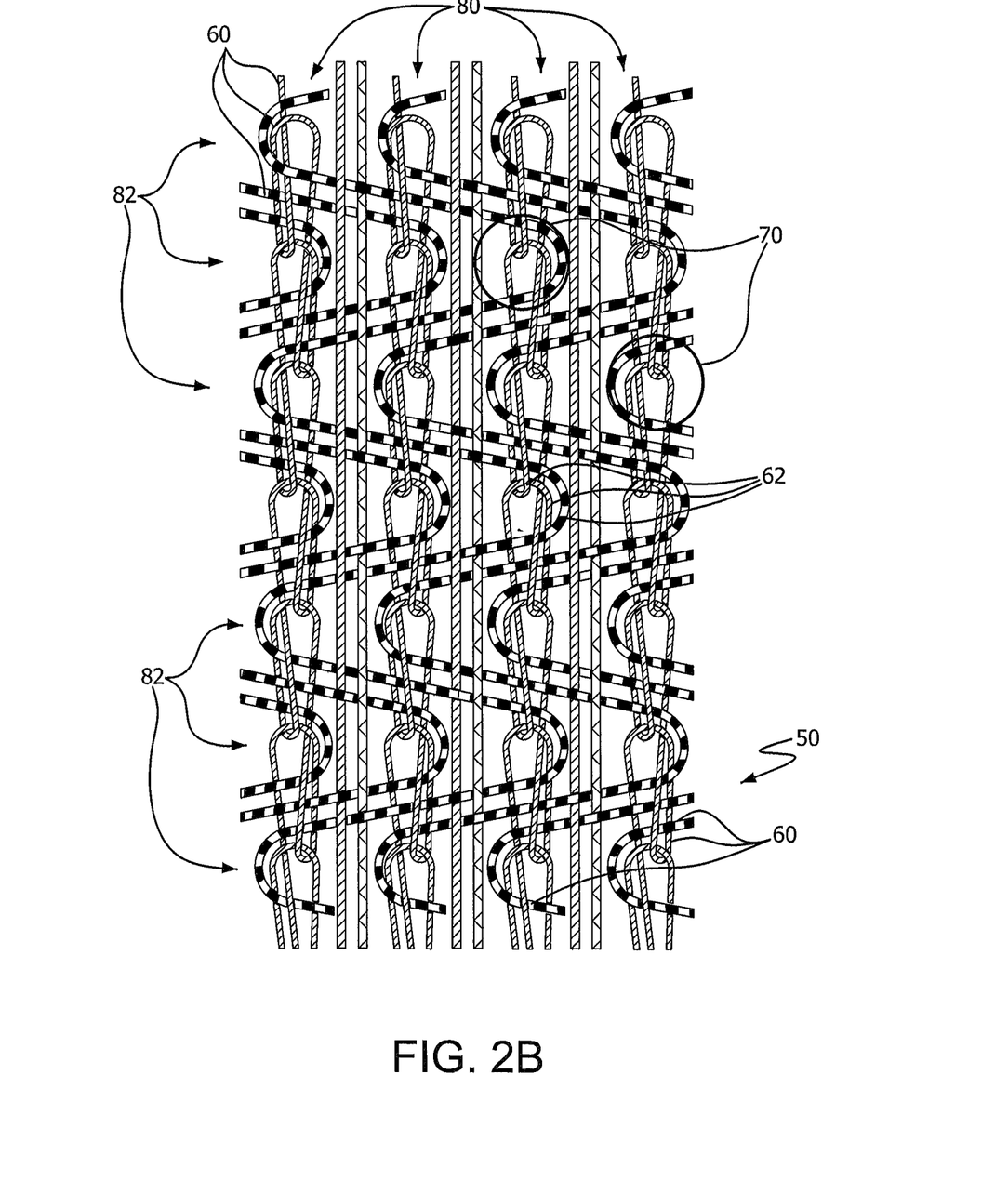

FIGS. 2A and 2B illustrate embodiments of the construction of a knit layer (50) of a filtration article embodiment. As will be understood, knit layer (50) may be positioned downstream and/or upstream of a filtration layer comprising a porous PTFE material (e.g., a PTFE membrane) for filtering particles from a fluid stream. In this regard, knit layer (50) may provide support and drainage functionality when located downstream of a filtration layer, and may provide drainage functionality when located upstream of a filtration layer.

Figure 3A:
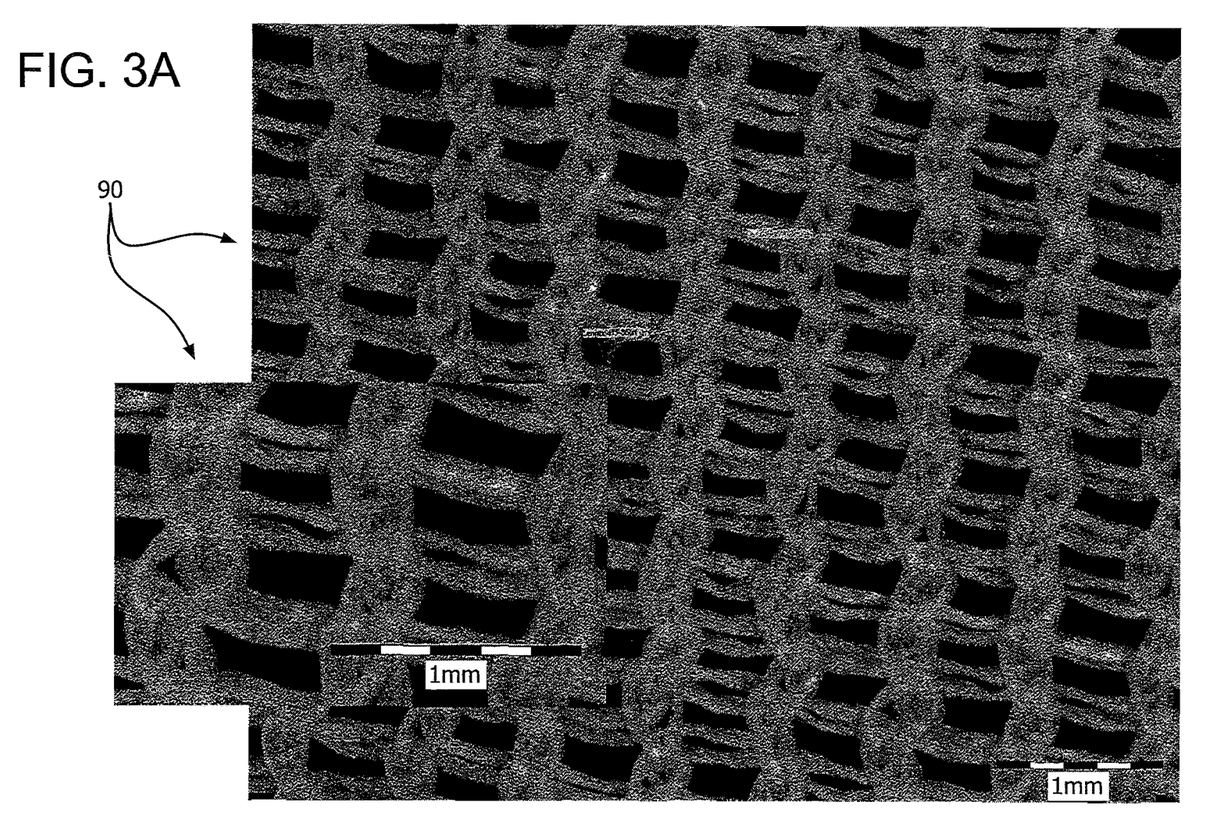
FIGS. 3A and 3B are images of a knit layer embodiment of a filtration article embodiment of the present invention.
Figure 3B:
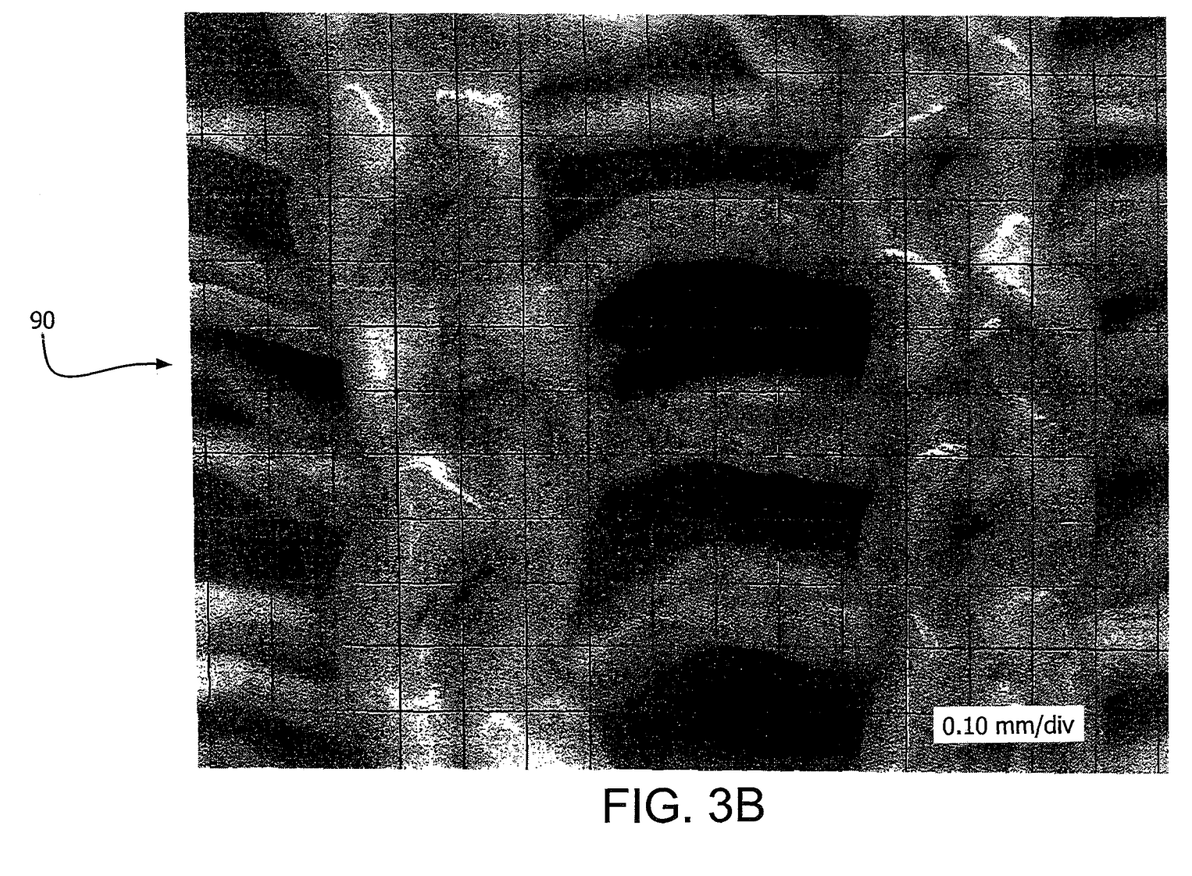

As shown in the embodiments of FIGS. 2A and 2B, knit layer (50) may comprise strands (60) of fluoropolymer fibers arranged to define a plurality of interlocking regions (70), two of which are encircled in each of FIGS. 2A and 2B. The knit layer (50) shown in FIGS. 2A and 2B illustrates the interlocking regions (70) in an untightened state for purposes of understanding, and it will be understood that the interlocking regions (70) are tightened prior to use (e.g., as shown in the embodiment of FIGS. 3A and 3B). As shown, each of the interlocking regions (70) are each defined by corresponding different sets of at least two interlocking loop portions (62) of the strands (60). The interlocking regions (70) may define a plurality of wales (80) and a plurality of courses (82).

The interlocking regions (70) may function to restrain relative movement and/or elongation of strands (60) between the interlocking regions (70) by distributing fluid pressure loads therebetween, thereby yielding enhanced stability. In this regard, in the embodiments shown in FIGS. 2A and 2B, the interlocking regions (70) are each defined by corresponding different sets of three interlocking loop portions (62) of the strands of fluoropolymer fibers (60). As shown, for a portion of the strands (60) each strand comprises different loop portions that partially define different, alternating ones of the plurality of interlocking regions (70) located along at least two different ones of said plurality of wales (80). Further, for another portion of strands (60) each strand comprises different loop portions that partially define different ones of all of the interlocking regions (70) located in a corresponding one of the wales (80). Such provision of interlocking regions (70) distributes a fluid pressure load applied to knit layer (50) by distributing the load at and across interlocking regions (70) located in different wales and courses.

For example, in the embodiment of FIG. 2A, for a portion of the strands (60), each strand comprises different loop portions that partially define different alternating ones of the plurality of interlocking regions (70) located along two adjacent ones of the wales (80), while in the embodiment of FIG. 2B, for a portion of the strands (60), each strand comprises different loop portions that partially define different alternating ones of the plurality of interlocking regions (70) located along two of the wales (80) having another one of the wales (80) located therebetween.

In various embodiments, the loop portions of strands (60) defining interlocking regions (70) may be disposed to extend about an arc of at least 90° along different corresponding arcuate paths. With reference to the embodiments of FIGS. 2A and 2B at least a portion of the loop portions of strands (60) corresponding with the interlocking regions (70) may be disposed to extend about an arc of at least 180° along different corresponding arcuate paths.

Figure 4A:
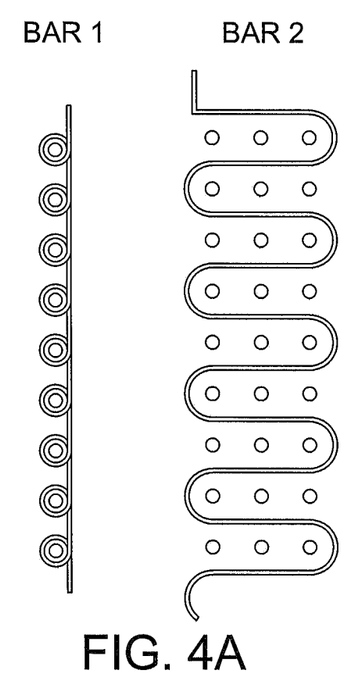
FIG. 4A illustrates the knit construction of another knit layer embodiment shown in FIG. 4B.
Figure 4B:
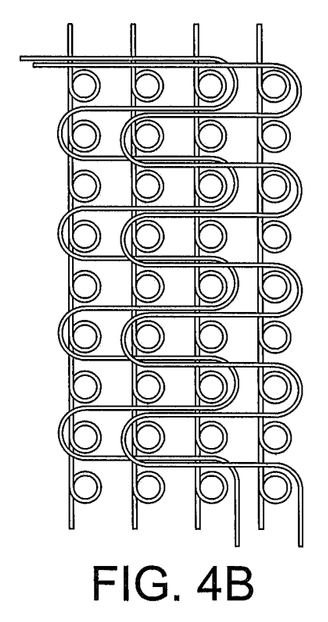

FIGS. 3A and 3B show images of an embodiment of a PTFE knit layer (90) of the present invention. The knit layer (90) is comprised of expanded PTFE (ePTFE) fiber and is constructed using a 2 bar in lay Raschel locked stitch design. The construction of such 2 bar in lay Raschel design is shown in FIGS. 4A and 4B. The knit layer (90) provides a dimensionally stable construction in the wale and warp directions.

The low coefficient of friction of PTFE poses a challenge in constructing a dimensionally stable knit. However, by using an interlock stitch design employing a 2 bar in lay interlock stitch, in the knit layers shown in FIGS. 2A, 2B, 3A and 3B, a dimensionally stable knit may be constructed.

While FIGS. 2A, 2B, 3A, 3B, 4A and 4B show specific knit design embodiments, it should be understood that any knit pattern yielding dimensional stability in the wale and/or course direction(s) such as a weft knit using an interlock stitch Tricot design may also be used.

The fluoropolymer knits described herein may be placed either upstream or downstream of a filtration membrane. Knit layers may also be placed on both upstream and downstream of the filtration membrane. The knit layers may be provided in a variety of configurations (e.g., planar, planar with pleats, tubular, tubular with pleats, etc.). In one arrangement, knit layers may be positioned on opposing sides of a filtration membrane and the layers may be pleated and sealed on the ends to form a pleated filtration cartridge, as contemplated above, using known methods described in the art. Further, the cartridge may further be placed in a capsule or housing through which a fluid stream passes.

In various embodiments an intermediate layer may be disposed between the filtration membrane and the knit layer. The intermediate layer may provide additional support. Suitable intermediate layers include porous fluoropolymer nets, wovens, membranes or non wovens. A preferred intermediate layer may be a porous fluoropolymer article described in U.S. Patent Publication No. 2012/064273.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

Test Methods and Measurements

Viscous Liquid Flow Test

An aqueous solution of glycerol was prepared by mixing 75% glycerol and 25% DI water on a volume basis. The viscosity of the solution at room temperature (75° F.) was measured to be about 40 cp. A filtration article test sample (47 mm diameter) was placed securely inside a holder. The glycerol solution was pumped through the test sample, wherein the initial pressure differential across the test sample was about 50 psid. The test sample comprised a stack of a filtration membrane and a downstream knit layer. Optionally, the test sample could include an intermediate layer and/or upstream knit layer. The pressure differential across the test sample was recorded, as noted in one or more of the Examples below, during the entire duration of the test.

The time taken for the initial pressure differential to drop from 50 psid to a lower value was used as an indicator of the sample strength. The longer it takes for the drop in differential pressure, the stronger, or more stable, the sample. For a sample of low strength, stability, it would take less than 10 minutes for the differential pressure to drop from 50 psid to a lower value. High strength samples typically maintain the initial differential pressure of 50 psid for about at least 24 hours.

It is believed that this test provides a stability measure of the ability of the drainage layer to adequately support the membrane layer against applied pressure. It is also believed that this test offers a correlation to long term particle filtration efficiency of the test sample. That is, a test sample of high strength as indicated by this test would also have superior long term particle filtration efficiency.

Long Term Particle Filtration Efficiency Test

This test was used to measure long term particle filtration efficiency of the filtration article test sample referenced above. The sample was placed on a stainless steel plate (diameter 90 mm) with 19 holes of diameter 9.6 mm spaced apart from each other such that the center to center distance between any two holes is 9.6 mm. The sample, along with the stainless steel plate was then placed inside a holder with a fluid inlet and outlet. The particle filtration efficiency was measured using the following test procedure and reported as the Initial Filtration Efficiency.

The test sample was first wet with IPA and then subjected to an initial rinse using 250 mL of a solution containing 0.1% Triton® X-100 in DI water. This rinse was done at about 3 psid differential pressure across the test sample. The effluent was collected and labeled as "background."

The challenge solution was prepared using 49 nm microspheres (Part No. B50, Thermo Fisher Scientific Inc.). The 49 nm challenge solution was prepared by adding 83 micro liter of a 1% by weight stock solution containing the 49 nm microspheres to 2 liters of a solution containing 0.1% Triton® X-100 in DI water.

Then, under a differential pressure of 6 psid across the filtration membrane, 250 mL of challenge solution was allowed to flow through the membrane. The challenge solution was directly exposed to fluid flow. The filtrate was collected and labeled as "downstream."

A Cary Eclipse fluorescent spectrophotometer was used to measure the fluorescence intensity of challenge solution, background and the downstream sample. The intensity measurements from the spectrophotometer were calibrated against a 3 point curve with calibration standards generated from a challenge solution of three different particle concentrations of a given microsphere size.

From the intensity values, the particle retention efficiency (E) in % was calculated according to the following equation:

$$E = 100\% * \left[1 - \left(\frac{downstream - background}{challenge - background}\right)\right]$$

A duplicate filtration article sample was placed on another stainless steel plate with design and dimensions as described above. The sample, along with the stainless steel plate was then placed inside a holder with a fluid inlet and outlet. The sample was exposed to Propylene Glycol flow at 140° C. for 14 days. The differential pressure across the sample was around 3.0 psid.

After 14 days, the particle filtration efficiency was measured on this sample as described above and reported as Final Efficiency (after 14 day exposure to Propylene glycol at 140° C.).

Negligible change between the initial and final efficiency numbers show that the test sample provided superior long term particle retention and would indicate that such a test sample would maintain its particle filtration efficiency over the life of the filtration device.

Bubble Point Measurement

The bubble point for a filtration membrane sample employable in a filtration article may be measured according to the general teachings of ASTM F31 6-03 using a Capillary Flow Porometer (Model CFP 1500 AEXL from Porous Materials Inc., Ithaca, N.Y.). The sample membrane may be placed into the sample chamber and wet with SilWick Silicone Fluid (available from Porous Materials Inc.) having a surface tension of 19.1 dynes/cm. The bottom clamp of the sample chamber has a 2.54 cm diameter, 3.175 mm thick porous metal disc insert (Mott Metallurgical, Farmington, Conn., 40 micron porous metal disk) and the top clamp of the sample chamber had a 3.175 mm diameter hole. Using the Capwin software version 6.62.1 the following parameters may be set as specified in the table immediately below. The values presented for bubble point were the average of two measurements.

| Parameter | Set Point |
| --- | --- |
| maxflow (cc/m) | 200000 |
| bublflow (cc/m) | 100 |
| F/PT (old bubltime) | 40 |
| minbppres (PSI) | 0 |
| zerotime (sec) | 1 |
| v2incr (cts) | 10 |
| preginc (cts) | 1 |
| pulse delay (sec) | 2 |
| maxpre (PSI) | 500 |
| pulse width (sec) | 0.2 |
| mineqtime (sec) | 30 |
| presslew (cts) | 10 |
| flowslew (cts) | 50 |
| eqiter | 3 |
| aveiter | 20 |
| maxpdif (PSI) | 0.1 |
| maxfdif (cc/m) | 50 |
| sartp (PSI) | 1 |
| sartf (cc/m) | 500 |

EXAMPLES

Example 1

A knit sample was made from expanded PTFE fiber with the characteristics described in Table I. A warp beam composed of 400 ends of the ePTFE fiber was created where tension over the width of the beam was held constant resulting in a warp beam with minimal wrinkles and fiber crossovers. The warp beam was placed on a typical 2-bar warp knitting machine. Additional supply cones of the ePTFE fiber were used for the insertion fiber. The desired knit was produced using a 2-bar in lay Raschel locked stitch design.

TABLE I

| Filament Type | Monofilament |
| --- | --- |
| PTFE Fiber Description | 100 Denier ePTFE flat fiber (Part Number V111776 (available from W. L. Gore & Associates, Inc) twisted at 32 Twists Per Inch (TPI), Z - configuration using a Ring Twister |
| PTFE Fiber Diameter | 90 micron |
| Knit Pattern | 2 bar in lay Raschel locked stitch |
| Knit Gauge | 32 |
| Knit Mass (g/m$^2$) | 180 |
| Wales Per Inch (WPI) | 33-35 relaxed |
| Courses Per Inch (CPI) | 94-96 relaxed |

The above knit layer was placed downstream of a layer of an expanded PTFE membrane made according to the teachings of U.S. Patent Publication No. 2010/0248324 and U.S. Patent Publication No. 2011/0039960 and U.S. Provisional Patent Application No. 61/538,625. This two layered stack was subject to the long term particle filtration efficiency test with the membrane side exposed to direct fluid flow. The initial efficiency and final efficiency were both measured to be 95% indicating superior long term particle retention of this stack.

This two layered stack was subject to the Viscous Liquid Flow Test where in the membrane side was directly exposed to fluid flow. No drop in differential pressure (from the initial value of 50 psid) across the stack was observed even after 24 hours. This test was run for 96 hours and no observable drop in differential pressure occurred even after 96 hours.

Example 2

An intermediate layer comprising a porous article having an expanded PTFE layer and a coherent irregular network of FEP particles on one side was made according to the teachings of U.S. Patent Publication No. 2012/064273. This layer was placed between the expanded PTFE membrane and the Knit layer of stack of Example 1. The orientation was such that the ePTFE layer of the intermediate layer was adjacent to the knit layer and the coherent irregular network of FEP particles was adjacent to the ePTFE layer of the stack. This stack was subject to the long term particle filtration efficiency test. The initial efficiency and final efficiency were both measured to be 95% indicating superior long term particle retention of this stack.

Comparative Example 1

The PTFE net layer and the expanded PTFE membrane were removed from a commercially available pleated cartridge filter (Product Number ABFG1GPK3EH1-K3 Ultikleen G2 Excellar ER 20 nm from Pall Corporation). This two layered stack was subject to the Viscous Liquid Flow Test where in the membrane side was directly exposed to fluid flow. The differential pressure dropped from 50 psid to less than about 5 psid within 5 minutes, indicating low stability.

According to the long term particle filtration efficiency test on the stack, the initial efficiency and final efficiency were measured to be 90% and 69% respectively indicating poor long term particle retention performance.

Comparative Example 2

The PTFE net layer and the expanded PTFE membrane were removed from a commercially available pleated cartridge filter (Product Number FLHF050-10M3F-PW-300 Fluoryte™ 50 nm from Pall Corporation). The two layered stack was subject to the Viscous Liquid Flow Test where in the membrane side was directly exposed to fluid flow. The differential pressure dropped from 50 psid to less than about 5 psid within 5 minutes, [REVIEW]

Comparative Example 3

A PFA woven layer was removed from a commercially available pleated cartridge filter (Product QCCYATM01, Quickchange® 0.03 micron rated cartridge from Mykrolis Corporation). A 0.1 micron rated pore size expanded PTFE membrane from a commercially available pleated cartridge filter (Fluoroflow® XF SELECT, Parker Hannifin Corporation) was placed upstream of the PFA woven layer. The two layered stack was subject to the Viscous Liquid Flow Test where in the PTFE membrane side was directly exposed to fluid flow. The differential pressure dropped from 50 psid to less than about 5 psid within 5 minutes.

What is claimed is:

1. A filtration article for filtration of particles from a fluid stream, comprising:
    a first layer, positionable across the fluid stream, comprising a porous polytetrafluoroethylene (PTFE) membrane for filtering particles from the fluid stream; and
    a second layer, positionable across said fluid stream to provide for at least one of drainage of and support of said first layer, comprising a plurality of strands of fluoropolymer fibers comprising PTFE arranged to form a knit having a plurality of interlocking regions that are each defined by corresponding different sets of at least two interlocking loop portions of said plurality of strands of fluoropolymer fibers, wherein said plurality of interlocking regions of the knit define a plurality of wales and a plurality of courses, and wherein for at least a first portion of said plurality of strands each strand comprises different loop portions that partially define different, alternating ones of said plurality of interlocking regions located along at least two different ones of said plurality of wales, wherein said plurality of interlocking regions define a plurality of voids therebetween across said second layer, wherein each of said plurality of voids has a corresponding first area when the second layer is not exposed to a pressure differential due to flow of fluid across the second layer wherein each of said plurality of voids has a corresponding second area when the second layer is exposed to a fluid stream that places a pressure load on the second layer of between about 1 psid and 10 psid, and wherein for each of said plurality of voids the corresponding second area is less than two times the corresponding first area thereof.

2. The filtration article of claim 1, wherein each of said plurality of interlocking regions is defined by corresponding different sets of at least three interlocking loop portions of said plurality of strands of fluoropolymer fibers.

3. The filtration article of claim 2, wherein for each of said plurality of interlocking regions the corresponding interlocking loop portions each extend about an arc of at least 90° along different, corresponding arcuate paths.

4. The filtration article of claim 3, wherein within a cross-section of each of said plurality of interlocking regions different lengths of the corresponding interlocking loop portions are located within at least three different stratums.

5. The filtration article of claim 4, wherein for each of said plurality of interlocking regions the corresponding interlocking loop portions each extend about an arc of at least 1800 along different, corresponding arcuate paths.

6. The filtration article of claim 4, wherein within each of said plurality of interlocking regions the corresponding interlocking loop portions are engaged along said corresponding arcuate paths to frictionally restrict relative movement therebetween.

7. The filtration article of claim 4, wherein each of said plurality of interlocking regions comprise a plurality of tortuous fluid flow paths extending through each of said at least three different stratums.

8. The filtration article of claim 1, wherein each of at least said portion of said plurality of strands is twisted.

9. The filtration article of claim 1, wherein at least a portion of said plurality of strands is twisted.

10. The filtration article of claim 1, wherein for at least a second portion of said plurality of strands each strand comprises different loop portions that partially define different ones of all of said plurality of interlocking regions located in a corresponding one of said plurality of wales.

11. The filtration article of claim 1, wherein each of said plurality of interlocking regions is located at corresponding distances from adjacent ones of said plurality of interlocking regions along said wales and courses, and wherein for each of said plurality of interlocking regions said corresponding distances while positioned in said fluid stream are within $_{200}$% of initial values thereof prior to being positioned in the fluid stream.

12. The filtration article of claim 1, wherein said second layer is positioned adjacent to and downstream of the first layer to provide for at least support of the first layer.

13. The filtration article of claim 12, wherein the first layer and the second layer are pleated and positioned in at least partially nested co-relation, and wherein pleats of said second layer extend parallel to one of said plurality of wales or said plurality of courses.

14. The filtration article of claim 13, further comprising: a pleated third layer, positionable across said fluid stream upstream of the first layer in at least partially nested co-relation to provide for drainage of the first layer, comprising a plurality of strands of fluoropolymer fibers arranged to form a knit having a plurality of interlocking regions that are each defined by corresponding different sets of at least two interlocking loop portions of said plurality of strands of fluoropolymer fibers, wherein said plurality of interlocking regions of the knit define a plurality of wales and a plurality of courses, and
wherein for at least a first portion of said plurality of strands each strand comprises different loop portions that partially define different, alternating ones of said plurality of interlocking regions located along at least two different ones of said plurality of wales.

15. The filtration article of claim 12, wherein the second layer is positioned directly adjacent to the first layer.

16. The filtration article of claim 12, wherein the first layer and second layer are interconnected.

17. The filtration article of claim 12, further comprising:
a third layer, positionable across said fluid stream upstream of the first layer to provide for drainage of the first layer, comprising a plurality of strands of fluoropolymer fibers arranged to form a knit having a plurality of interlocking regions that are each defined by corresponding different sets of at least two interlocking loop portions of said plurality of strands of fluoropolymer fibers, wherein said plurality of interlocking regions of the knit define a plurality of wales and a plurality of courses, and wherein for at least a first portion of said plurality of strands each strand comprises different loop portions that partially define different, alternating ones of said plurality of interlocking regions located along at least two different ones of said plurality of wales.

18. The filtration article of claim 17, wherein the first layer, second layer, and third layer are interconnected.

19. The filtration article of claim 1, wherein voids extend between the plurality of interlocking regions through the second layer.

20. The filtration article of claim 19, wherein areas of opposing sides of said second layer are defined by said knit and said voids, and wherein said voids define at least 10% of said areas.

21. The filtration article of claim 20, wherein said interlocking regions define at least 40% of said areas.

22. The filtration article of claim 1, wherein said porous PTFE membrane has a bubble point of at least about 30 psi.

23. The filtration article of claim 1, wherein said porous PTFE membrane has a bubble point of at least about 50 psi.

24. The filtration article of claim 1, further comprising at least one intermediate layer disposed between the first layer and the second layer.

25. The filtration article of claim 1 in which the plurality of strands comprising the second layer are fibers arranged to form a Raschel knit.

26. The filtration article of claim 1 in which the knit is stable in at least two orthogonal directions.

27. The filtration article of claim 1 in which the fluoropolymer fibers comprise twisted filaments.

28. The filtration article of claim 1 in which the fluoropolymer fibers comprise one of a monofilament and a multifilament.

29. The filtration article of claim 1 in which the fluoropolymer fibers comprise hollow filaments.

30. A filtration device having a filter cage and a filter element disposed within the cage, the filter element comprising the filtration article of claim 1, wherein the first and second layers are pleated and potted to join the first and second layers along at least one edge.

31. A filtration capsule containing the filtration device of claim 30.

32. The filtration article of claim 1 in which the fluoropolymer fibers are selected from the group consisting of PTFE, PFA, PVDF, and FAP.

33. A method for filtering particles from a fluid stream, comprising:
filtering particles from the fluid stream having a fluid pressure utilizing a porous polytetrafluoroethylene (PTFE) membrane positioned across the fluid stream; and,
supporting said porous PTFE membrane against a fluid pressure load applied by the fluid stream utilizing a stable knit layer comprising PTFE positioned downstream of the porous PTFE membrane, and wherein said fluid stream has fluid pressure load of between about 1 psid and 10 psid, wherein the knit layer includes a plurality of strands of fluoropolymer fibers comprising PTFE arranged to form a knit having a plurality of interlocking regions, said plurality of interlocking regions define a plurality of voids therebetween across said stable knit layer, wherein each of said plurality of voids has a corresponding first area prior to being positioned in said fluid stream and a corresponding second area while positioned in said fluid stream, and wherein for each of said plurality of voids the corresponding second area is less than two times the corresponding first area thereof.

34. The method of claim 33, wherein said knit layer comprises a plurality of strands of fluoropolymer fibers comprising PTFE arranged to form a knit having a plurality of interlocking regions that are each defined by corresponding different sets of at least two interlocking loop portions of said plurality of strands of fluoropolymer fibers.

35. The method of claim 34, wherein said supporting step comprises: distributing said fluid pressure load across said knit layer at said interlocking regions thereof.

36. The method of claim 35, wherein said plurality of interlocking regions of the knit define a plurality of wales and a plurality of courses, and wherein for at least a first portion of said plurality of strands each strand comprises different loop portions that partially define different, alternating ones of said plurality of interlocking regions located along at least two different ones of said plurality of wales.

37. The method of claim 36, wherein each of said plurality of interlocking regions is located at corresponding distances from adjacent ones of said plurality of interlocking regions along said wales and courses, and wherein for each of said plurality of interlocking regions said corresponding distances while positioned in said fluid stream are within 200% of initial values thereof prior to being positioned in the fluid stream.

38. The method of claim 36, wherein each of said plurality of interlocking regions is defined by corresponding different sets of at least three interlocking loop portions of said plurality of strands of fluoropolymer fibers.

* * * * *